(12) United States Patent
Ernst et al.

(10) Patent No.: US 7,276,260 B2
(45) Date of Patent: Oct. 2, 2007

(54) **INHIBITION OF *TYROPHAGUS PUTRESCENTIAE* IN PET FOOD PRODUCTS**

(75) Inventors: Thomas J. Ernst, St. Louis, MO (US);
Robert S. Lepp, St. Louis, MO (US);
Janet R. Jackson, Columbia, IL (US)

(73) Assignee: Nestec, Ltd., Vevey (CH)

( * ) Notice: Subject to any disclaimer, the term of this patent is extended or adjusted under 35 U.S.C. 154(b) by 125 days.

(21) Appl. No.: 09/862,077

(22) Filed: May 21, 2001

(65) Prior Publication Data

US 2002/0172740 A1    Nov. 21, 2002

(51) Int. Cl.
*A23D 9/05* (2006.01)
*A23K 1/18* (2006.01)

(52) U.S. Cl. .......... 426/92; 426/89; 426/102; 426/310; 426/335; 426/805

(58) Field of Classification Search .......... 426/92, 426/102, 89, 310, 335, 805
See application file for complete search history.

(56) References Cited

U.S. PATENT DOCUMENTS 4,282,254 A * 8/1981 Franzen et al. .......... 426/2
5,230,913 A * 7/1993 Klemann .......... 426/97
5,662,953 A * 9/1997 Wheeler et al. .......... 426/2

FOREIGN PATENT DOCUMENTS

GB    2355382 A * 4/2001

* cited by examiner

*Primary Examiner*—Helen Pratt
(74) *Attorney, Agent, or Firm*—Bell, Boyd & Lloyd LLP

(57) ABSTRACT

A method of inhibiting the growth of *Tyrophagus putrescentiae* in a pet food product includes the step of adding at least 0.3% by weight conjugated linoleic acid (CLA) to the pet food product. Specifically, adding conjugated linoleic acid to the pet food product includes the steps of adding conjugated linoleic acid to a pet food meal pre-mix, extruding the conjugated linoleic acid containing premix to form the pet food product, cutting the pet food product to size, and drying the pet food product. The method can further include the step of coating the dried, cut to size pet food product with conjugated linoleic acid.

2 Claims, 1 Drawing Sheet

```
                    10
                    ↓
     ┌─────────────────────────────────────────┐
12   │ Adding At Least 0.5% CLA To A Pet Food  │
     │ Meal Pre-Mix.                           │
     └─────────────────────────────────────────┘
                    ↓
     ┌─────────────────────────────────────────┐
14   │ Extruding The CLA Containing Pre-Mix.   │
     └─────────────────────────────────────────┘
                    ↓
     ┌─────────────────────────────────────────┐
16   │ Cutting The Pet Food To Size.           │
     └─────────────────────────────────────────┘
                    ↓
     ┌─────────────────────────────────────────┐
18   │ Drying The Pet Food Product             │
     └─────────────────────────────────────────┘
                    ↓
     ┌─────────────────────────────────────────┐
20   │ Coating The Pet Food With A CLA         │
     └─────────────────────────────────────────┘
```

INHIBITION OF *TYROPHAGUS PUTRESCENTIAE* IN PET FOOD PRODUCTS

BACKGROUND OF THE INVENTION

This invention relates generally to inhibition of growth and reproduction of *Tyrophagus putrescentiae*, and more particularly, to inhibition of growth and reproduction of *Tyrophagus putrescentiae* in pet food product by conjugated linoleic acid.

Pet food products are sometimes stored in distribution centers before sale to the public, and are also typically stored in homes by pet owners after purchase and before consumption by pets. Sometimes stored pet food products can be spoiled and/or consumed by pests such as mites. One common mite classified as *Tyrophagus putrescentiae* is known to feed and propagate in some pet food products.

Preservatives incorporated in the pet food product at excess levels can be used to inhibit infestation of pet food products by organisms such as *Tyrophagus putrescentiae*. However, most preservatives used add no positive nutritional value to pet food products.

It would therefore be desirable to provide a method of protecting pet food products during storage from *Tyrophagus putrescentiae*. Also it would be desirable to provide a method of inhibiting growth and reproduction of *Tyrophagus putrescentiae* in pet food products.

BRIEF SUMMARY OF THE INVENTION

In an exemplary embodiment of the present invention, a method of inhibiting the growth of *Tyrophagus putrescentiae* in a dry pet food product includes the step of adding conjugated linoleic acid (CLA) to the dry pet food. Specifically, and in one embodiment, at least 0.3% by weight conjugated linoleic acid is added to the dry pet food product. More specifically, adding conjugated linoleic acid to the dry pet food includes the steps of adding conjugated linoleic acid to a pet food meal pre-mix, extruding the CLA containing premix to form the pet food, cutting the pet food to size, and drying the pet food. In one embodiment, the method further includes coating the dried, cut to size pet food with conjugated linoleic acid.

The above described method provides a pet food that is protected during storage from *Tyrophagus putrescentiae*. More specifically, the method provides a pet food that includes CLA which inhibits growth and reproduction of *Tyrophagus putrescentiae* in the pet food product. Further, the CLA adds positive nutritional value to the pet food product.

DETAILED DESCRIPTION OF THE INVENTION

Figure 1:
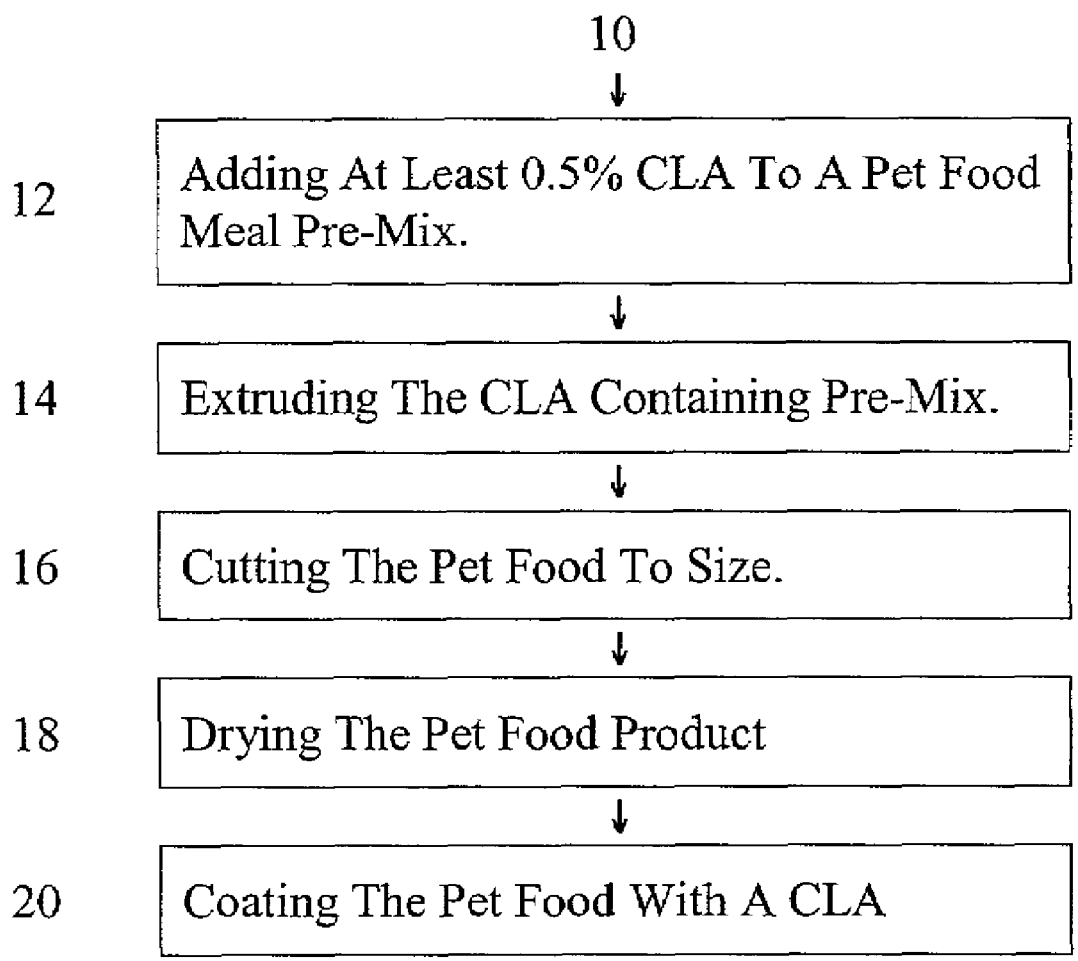
FIG. 1 is flow chart of a method of inhibiting the growth of *Tyrophagus putrescentiae* in a dry pet food product.

Referring to FIG. 1, a method 10 of inhibiting the growth of *Tyrophagus putrescentiae* in a pet food product includes the steps of adding 12 conjugated linoleic acid (CLA) to a pet food meal pre-mix, extruding 14 the CLA containing premix to form the pet food product, cutting 16 the pet food to size, and drying 18 the pet food product. In one embodiment, method 10 further includes coating 20 the dried, cut to size pet food product with CLA. The resultant finished, dried, and cut to size pet food product contains at least 0.3% by weight CLA which inhibits the growth and reproduction of *Tyrophagus putrescentiae* in the stored pet food product. It should be understood that the term pet food product includes dry pet food, semi-moist pet food, and pet treats.

The step of adding 12 CLA to a meal pre-mix includes combining a plurality of ingredients to form the meal pre-mix. The plurality of ingredients include, for example, grains, minerals, amino acids, meat meals, additives, and the like. The plurality of ingredients are mixed in a mixer or a series of mixers, and the temperature and moisture content are adjusted to predetermined levels, for example, about 190° F. to about 220° F. and about 20% to about 35% by weight moisture content, prior to inputting the mixture of ingredients into an extruder. In one embodiment, the CLA is added to the plurality of ingredients in the mixer.

In the step of extruding 14 the CLA containing meal pre-mix, the ingredients are further mixed and heated in the extruder to a predetermined temperature, for example from about 200° F. to about 300° F. The meal pre-mix is then extruded through an extruder diecap having a plurality of openings. The extruded product stream is then cut into pieces or kibbles of a predetermined size of, for example, about 0.1 inch to about 0.5 inch.

In the step of drying 18, the kibbles are dried in a dryer at about 290° F. to about 340° F. to a moisture content of, for example, about 5% to about 15%, and coated or dusted with a suitable material. The coating material is, for example, liquid animal digest, concentrated liquid animal digest, animal tallow or a dry coating such as dried yeast. The finished pet food product is then packaged for sale. In one embodiment, method 10 includes coating 20 the pet food product with CLA. In this embodiment, the coating material includes CLA.

Any suitable material containing CLA can be used in method 10. Examples of suitable conjugated linoleic acid containing materials include, but are not limited to, hydrolyzed plant oil, hydrolyzed vegetable oil, hydrolyzed animal oil, hydrolyzed animal fat and mixtures thereof. The CLA is formed by hydrolyzing the linoleic acid contained in plant oil, vegetable oil, animal oil, and animal fat, for example, tall oil, bran oil, coconut oil, corn oil, fish oil, safflower oil, soybean oil, cotton seed oil, rapseed oil, sunflower oil, beef fat, lamb fat, rabbit fat, turkey fat, swine fat, and poultry fat. Of course, different oils and fats include different levels of linoleic acid. It is preferred that the oils and fats contain at least 50% by weight linoleic acid. Oils and fats having less than 50% linoleic acid are acceptable, but require more of the hydrolyzed material to achieve the desired levels CLA in the finished pet food product. Further, the conjugation of linoleic acid can result in a plurality of isomers. The CLA used in method 10 includes one or more of 9-Z, 11-E linoleic acid, 10-E, 12-Z linoleic acid and all other active isomeric forms of conjugated linoleic acid.

In one embodiment, at least 0.3% CLA in the finished pet food product inhibits growth and reproduction of *Tyrophagus putrescentiae* in the pet food product. Further, the CLA adds positive nutritional value to the pet food product. Specifically, tests of pet food containing at least 0.3% by weight CLA processed in accordance with method 10 showed that the growth and reproduction of *Tyrophagus putrescentiae* was significantly less than a control pet food product that was not proceed in accordance with method 10 and that did not contain CLA.

The tests were run by placing 14 kibble pieces of a pet food product containing CLA, and processed according to method 10, were placed in each of ten 60 mm by 15 mm dishes. Each dish was innoculated with about 30 mites (*Tyrophagus putrescentiae*), and sealed with parafilm. The ten dishes formed a treatment and were placed in a tray in an environmental chamber circulating humid air of about 65% RH to about 67% RH at 76° F. The percent by weight of CLA varied from about 0.4% to about 1.5% in the test samples. Ten control dishes using a standard pet food product containing no CLA were also prepared and tested as described above. The population of mites were monitored in each test sample for five weeks, and the results showed that there was an exploding population of mites in the control sample dishes. By exploding population is meant that the population was so large it could not be counted. The population of mites in the test samples having CLA and processed according to method 10 varied from a low of 9 mites to a high of about 2500 mites.

In alternative embodiments, the CLA is added to the meal pre-mix only, or the CLA is added to the meal pre-mix and coated on the extruded kibbles, or the CLA is coated on the extruded kibbles only to produce a pet food product containing a predetermined amount of CLA.

While the invention has been described in terms of various specific embodiments, those skilled in the art will recognize that the invention can be practiced with modification within the spirit and scope of the claims.

What is claimed is:

1. A method of manufacturing a pet food product having inhibition against the growth of *Tyrophagus putrescentiae*, said method comprising the steps of:
    extruding a meal pre-mix to form the pet food product;
    cutting the pet food product to size;
    coating the cut to size pet food product with conjugated linoleic acid and animal tallow; and
    drying the pet food product to form a pet food product containing at least 0.3% by weight conjugated linoleic acid.

2. A method in accordance with claim 1 wherein the pet food product is coated with at least 2% by weight animal tallow.

* * * * *